(12) United States Patent
Yamazaki et al.

(10) Patent No.: US 11,279,435 B2
(45) Date of Patent: Mar. 22, 2022

(54) OPERATION UNIT STRUCTURE OF STRADDLE-TYPE VEHICLE, AND STRADDLE-TYPE VEHICLE

(71) Applicant: HONDA MOTOR CO., LTD., Tokyo (JP)

(72) Inventors: Sekai Yamazaki, Wako (JP); Jun Yoneda, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 264 days.

(21) Appl. No.: 16/454,130

(22) Filed: Jun. 27, 2019

(65) Prior Publication Data
US 2020/0010139 A1    Jan. 9, 2020

(30) Foreign Application Priority Data

Jul. 5, 2018 (JP) .............................. JP2018-128381

(51) Int. Cl.
| | | |
|---|---|---|
| *B62K 23/02* | (2006.01) | |
| *B62K 11/14* | (2006.01) | |
| *B62J 6/16*  | (2020.01) | |
| *H01H 9/06*  | (2006.01) | |

(52) U.S. Cl.
CPC ............. *B62K 23/02* (2013.01); *B62J 6/16* (2013.01); *B62K 11/14* (2013.01); *H01H 9/06* (2013.01); *H01H 2009/068* (2013.01)

(58) Field of Classification Search
CPC ........................................................ B62J 6/16
See application file for complete search history.

(56) References Cited

U.S. PATENT DOCUMENTS

2004/0190302 A1* 9/2004 Mascadri ................ B62J 6/16
                                                        362/474
2015/0369357 A1   12/2015 Lee et al.

FOREIGN PATENT DOCUMENTS

| CA | 2167510 | 2/2002 | |
|---|---|---|---|
| EP | 2281738 B1 * | 6/2014 | ............. H01H 9/182 |
| JP | 03-021582 | 1/1991 | |
| JP | 2000-196529 | 7/2000 | |
| JP | 2005-193703 | 7/2005 | |
| JP | 2011-201351 | 10/2011 | |
| JP | 2013-208996 | 10/2013 | |
| JP | 2015-016755 | 1/2015 | |
| JP | 2015-085919 | 5/2015 | |
| JP | 2016-020210 | 2/2016 | |
| JP | 6005883 | 10/2016 | |
| WO | 2017/038644 | 3/2017 | |
| WO | WO-2017038644 A1 * | 3/2017 | ............... H01H 9/16 |

OTHER PUBLICATIONS

TranslationWO-2017038644.*
Indian Office Action for Indian Patent Application No. 201914026433 dated Sep. 21, 2020.
Japanese Office Action for Japanese Patent Application No. 2018-128381 dated Feb. 25, 2020.

* cited by examiner

*Primary Examiner* — Vicky A Johnson
(74) *Attorney, Agent, or Firm* — Amin, Turocy & Watson, LLP (57) ABSTRACT

An operation unit structure of the embodiment includes a switch case disposed close to a grip part of a handlebar of a straddle-type vehicle, an operating element provided in the switch case, and indicators and provided in the switch case common to the operating element.

11 Claims, 10 Drawing Sheets

OPERATION UNIT STRUCTURE OF STRADDLE-TYPE VEHICLE, AND STRADDLE-TYPE VEHICLE

CROSS-REFERENCE TO RELATED APPLICATION

Priority is claimed on Japanese Patent Application No. 2018-128381, filed Jul. 5, 2018, the content of which is incorporated herein by reference.

BACKGROUND

Field of the Invention

The present invention relates to an operation unit structure of a straddle-type vehicle, and a straddle-type vehicle.

Description of Related Art

Conventionally, a structure having a handle switch provided at a position adjacent to a handle grip at a portion on a right side of a straddle-type vehicle is known (for example, Japanese Unexamined Patent Application, First Publication No. 2016-20210). An engine stop switch and an engine start switch are provided in such a handle switch. The engine stop switch is of a seesaw switch in which a position on one side or the other side is held unless an operating force is applied.

SUMMARY

Incidentally, in a case of a vehicle traveling off-road, an indicator capable of displaying vehicle information may be provided in the front of a handle pipe with a stay or the like therebetween in some cases. However, when an indicator is provided via a stay or the like, the number of parts increases.

The present invention is provided to reduce the number of parts in an operation unit structure of a straddle-type vehicle having an indicator.

An operation unit structure of a straddle-type vehicle according to the present invention employs the following configuration.

(1) An operation unit structure of a straddle-type vehicle according to the present invention includes a switch case disposed close to a grip part of a handlebar of a straddle-type vehicle, an operating element provided in the switch case, and indicators provided in the switch case common to the operating element.

(2) In the above mentioned aspect of (1), the indicators may be disposed on a surface protruding furthest rearward of the switch case.

(3) In the aspect of above mentioned (1) or (2), display surfaces of the indicators may be directed inward in a vehicle width direction.

(4) In the aspect of any one of above mentioned (1) to (3), the operating element may be a start switch, and the indicators may be disposed above the start switch.

(5) In the above mentioned aspect of (4), a recess which is recessed forward from the installation surface of the indicators may be provided in the switch case, and the start switch may be disposed in the recess.

(6) In the aspect of any one of above mentioned (1) to (5), the operation unit structure of a straddle-type vehicle may further include a push switch including a pair of an upper pushing operation unit and a lower pushing operation unit vertically adjacent to each other, in which the indicators may be disposed below the push switch.

(7) In the aspect of any one of above mentioned (1) to (6), the operation unit structure of a straddle-type vehicle may further include the push switch including the pair of the upper pushing operation unit and the lower pushing operation unit vertically adjacent to each other, in which, in a side view, the switch case may include a raised part that is raised outward with respect to the upper pushing operation unit.

(8) In the above mentioned aspect of (7), in a side view, the raised part may be raised upward from a reference region having an arcuate outer shape centered on an axis of the handlebar and passing through an operation surface of the lower pushing operation unit and may cover the upper pushing operation unit from a lateral side.

(9) In the above mentioned aspect of (8), in a side view, the push switch may be capable of pivoting, and the upper pushing operation unit may overlap the raised part in a pivot range of the push switch.

(10) In the aspect of any one of above mentioned (1) to (9), the grip part may be provided at a portion on a right side of the handlebar, a throttle housing disposed close to the grip part may be further provided, the switch case may be adjacent to the throttle housing, and the switch case and the throttle housing may be non-rotatably fitted to each other around an axis of the handlebar.

(11) In the aspect of any one of above mentioned (1) to (10), a handlebar insertion part through which the handlebar is inserted may be provided in the switch case, the operating element may be the start switch disposed below the handlebar insertion part, a lower housing disposed below the handlebar insertion part and configured to accommodate a portion of the start switch on a side opposite to an operation surface may be further provided, and a protrusion protruding toward a side wall of the switch case may be provided at an upper portion of the lower housing.

(12) A straddle-type vehicle according to the present invention includes the any one of above mentioned (1) to (11) operation unit structure of a straddle-type vehicle.

According to the above mentioned aspect of (1), it is not necessary to separately and independently provide a stay or the like for installing the indicators due to the indicators provided in the switch case common to the operating element. Accordingly, the number of parts can be reduced. In addition, since the indicators can be seen at the time of operating the operating element, visibility of the indicators is improved.

According to the above mentioned aspect of (2), since the indicators are disposed on the surface protruding furthest rearward of the switch case so that the indicators can be made to stand out, the visibility of the indicators is further improved.

According to the above mentioned aspect of (3), since display surfaces of the indicators are directed inward in the vehicle width direction so that the display surfaces of the indicators face the occupant, the visibility of the indicators is further improved.

According to the above mentioned aspect of (4), since the indicators are disposed above the start switch, the indicators can be made more visible at the time of starting.

According to the above mentioned aspect of (5), since the recess which is recessed forward from the installation surface of the indicators is provided in the switch case and the start switch is disposed in the recess, it is possible to prevent the knee from hitting the start switch from below. In addition, since it is not necessary to separately and independently provide a cover for protecting the knee from hitting the start switch, the number of parts can be reduced.

According to the above mentioned aspect of (6), since the push switch including a pair of the upper pushing operation unit and the lower pushing operation unit vertically adjacent to each other is further provided and the indicators are disposed below the push switch, the following effects are achieved. The indicators can be made more visible at the time of operating the push switch.

According to the above mentioned aspect of (7), since the switch case includes the raised part that is raised outward with respect to the upper pushing operation unit in a side view, it is possible to prevent the knee from hitting the upper pushing operation unit from above. In addition, since it is not necessary to separately and independently provide a cover for protecting the knee from hitting the upper pushing operation unit, the number of parts can be reduced.

According to the above mentioned aspect of (8), in a side view, since the raised part is raised upward from the reference region having an arcuate outer shape centered on the handlebar axis and passing through the operation surface of the lower pushing operation unit and covers the upper pushing operation unit from a lateral side, it is possible to prevent the knee from hitting the upper pushing operation unit from the lateral side.

According to the above mentioned aspect of (9), in a side view, since the upper pushing operation unit overlaps the raised part in the pivot range of the push switch, the upper pushing operation unit can be protected from external factors in the pivot range of the push switch.

According to the above mentioned aspect of (10), since the switch case and the throttle housing are non-rotatably fitted to each other around the handlebar axis, there is no need to separately and independently provide a member for positioning the switch case and the throttle housing around the handlebar axis. Accordingly, the switch case and the throttle housing can be positioned relative to each other while reducing the number of parts.

According to the above mentioned aspect of (11), since the lower housing disposed below the handlebar insertion part and configured to accommodate a portion of the start switch on a side opposite to an operation surface is further provided and a protrusion protruding toward a side wall of the switch case is provided at an upper portion of the lower housing, the following effects are achieved. By locking a harness connected to the indicators or the like to the lateral protrusion of the lower housing, the protrusion of the lower housing can be caused to function as a harness guide.

According to the above mentioned aspect of (12), since the straddle-type vehicle includes the operation unit structure described above, the number of parts can be reduced.

DETAILED DESCRIPTION OF THE INVENTION

Hereinafter, embodiments of the present invention will be described with reference to the drawings. In the following description, directions such as forward, rearward, left, and right are the same as directions in a vehicle to be described below unless otherwise specified. Also, an arrow FR indicating the front of the vehicle, an arrow LH indicating the left of the vehicle, and an arrow UP indicating an upper side of the vehicle are illustrated at suitable positions in the drawings used for the following description.

<Vehicle in General>

Figure 1:
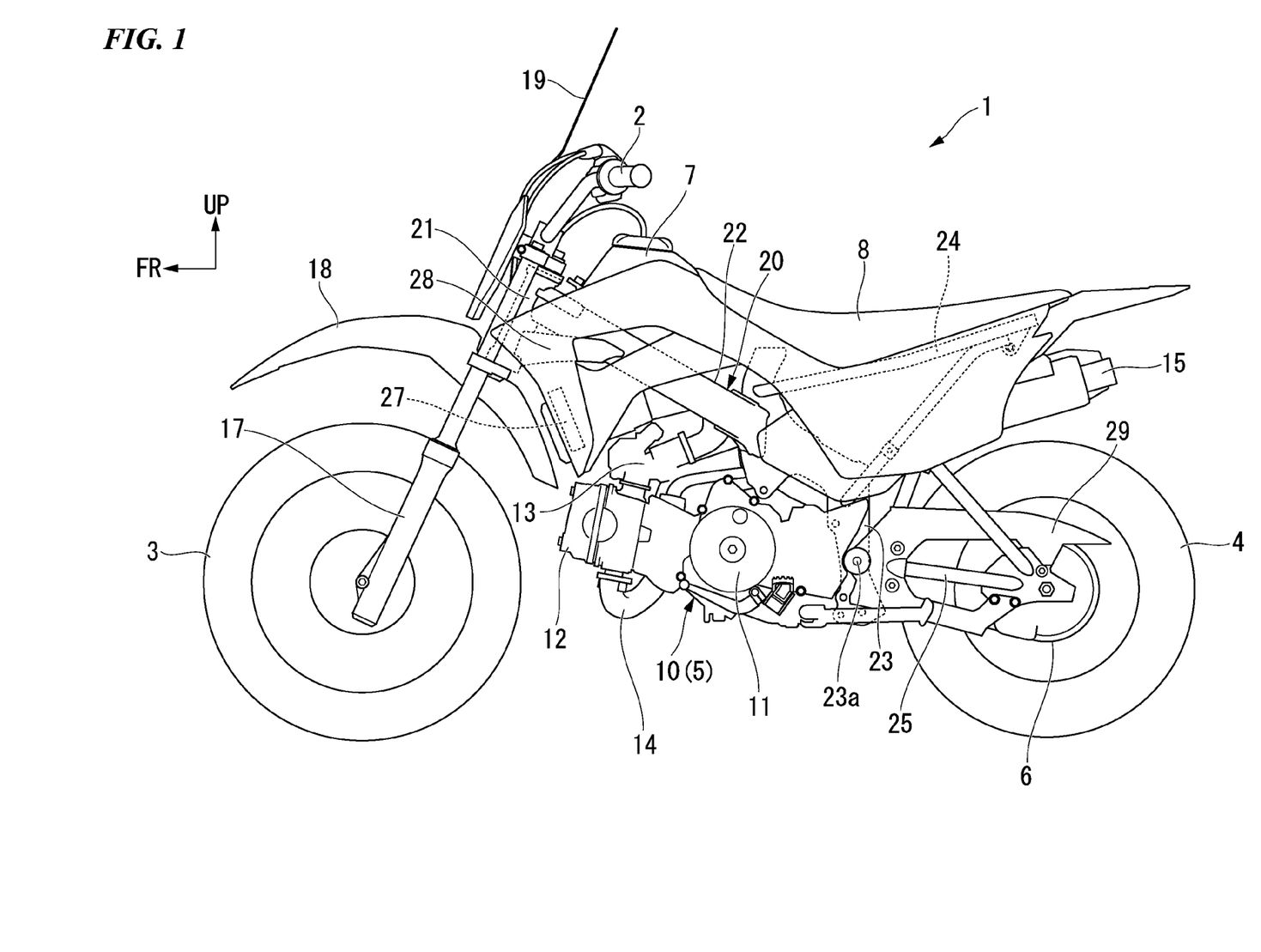
FIG. 1 is a left side view of a motorcycle according to an embodiment.

FIG. 1 illustrates an off-road type motorcycle 1 as an example of a straddle-type vehicle. For example, the motorcycle 1 may be a small bike (kids' bike) on which a child can ride. Referring to FIG. 1, the motorcycle 1 includes a front wheel 3 steered by a bar-type handlebar 2 and a rear wheel 4 driven by a power unit 5 including an engine 10. Hereinafter, the motorcycle may be simply referred to as a "vehicle" in some cases.

Components of a steering system including the handlebar 2 and the front wheel 3 are supported to be steerable by a head pipe 21 formed at a front end of a vehicle body frame 20. A handle steering shaft (not illustrated) connected to the handlebar 2 is inserted into the head pipe 21. A power unit 5 is disposed at a central portion in a front-rear direction of the vehicle body frame 20. At the rear portion of the power unit 5, a pivoting arm 25 is supported to be vertically rockable around a pivot shaft 23a. A rear suspension (not illustrated) is interposed between the front portion of the pivoting arm 25 and the rear portion of the vehicle body frame 20.

For example, the vehicle body frame 20 may be formed by integrally combining a plurality of types of steel pieces by welding or the like. The vehicle body frame 20 includes a pair of left and right main frames 22 extending rearward and downward from the head pipe 21, a pair of left and right pivot plates 23 extending downward from rear end portions of the left and right main frames 22, a cross member (not illustrated) extending in a vehicle width direction so that the left and right main frames 22 are connected to each other, and seat rails 24 extending rearward and upward from rear upper end portions of the left and right main frames 22.

The engine 10 is a single cylinder engine having a crankshaft parallel to the vehicle width direction. The engine 10 includes a crankcase 11 that constitutes a rear portion of the engine 10 and a cylinder 12 provided to stand forward and upward from a front portion of the crankcase 11.

A throttle body 13 of an engine intake system is connected to an upper portion of the cylinder 12. An exhaust pipe 14 of an engine exhaust system is connected to a lower portion of the cylinder 12.

A rear portion of the crankcase 11 also serves as a transmission case that accommodates a clutch and a transmission. An output shaft (not illustrated) of the transmission protrudes from a left portion of a rear portion of the crankcase 11. The output shaft of the transmission and the rear wheel 4 are connected via a chain transmission mechanism 6.

A fuel tank 7 is disposed above the cylinder 12 and between the left and right main frames 22. A seat 8 extending in a front-rear direction is disposed behind the fuel tank 7 and on the seat rails 24. A front portion of the seat 8 is supported by an upper surface of a rear portion of the fuel tank 7.

In FIG. 1, reference 17 denotes a front fork, reference 18 denotes a front fender, reference 19 denotes a bib support stay, reference 27 denotes a radiator, reference 28 denotes a pair of left and right shrouds covering a range from a side surface of the fuel tank 7 to the front of a side surface of the radiator 27, reference 29 denotes a chain cover, and reference 15 denotes a muffler connected to the exhaust pipe 14.

Figure 2:
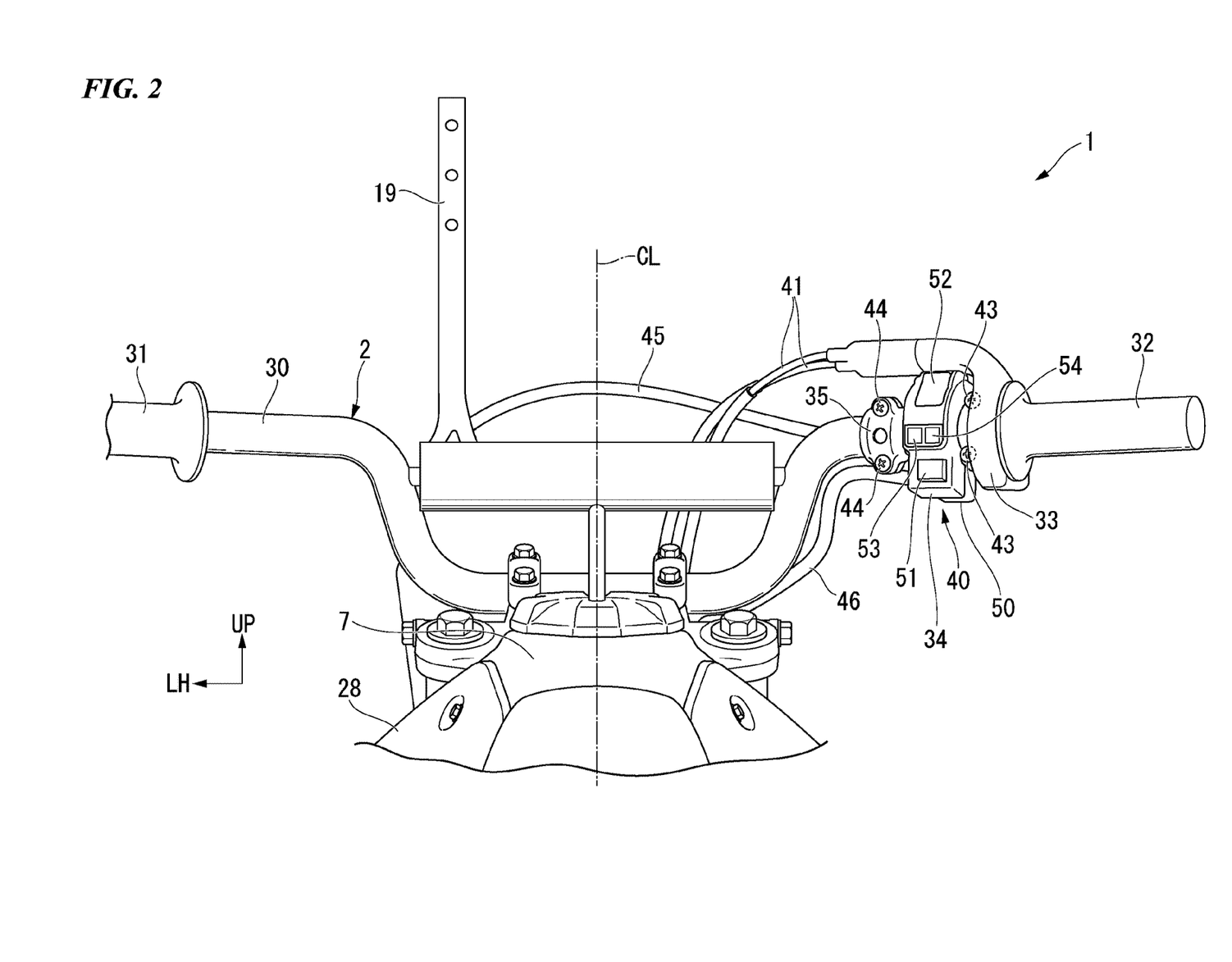
FIG. 2 is a view of an operation unit structure of the motorcycle according to the embodiment together with a surrounding structure when viewed from the rear.

As illustrated in FIG. 2, the handlebar 2 is a bar handle manufactured by bending a single piece of cylindrical handle pipe 30 made of a single metal. A grip 31 gripped by a driver (occupant) with a left hand is attached to a left end portion of the handlebar 2. In FIG. 2, a reference CL denotes a vehicle body lateral center line.

<Operation Unit Structure 40>

A throttle grip 32 attached to the handle pipe 30 such that it is relatively rotatable, a throttle housing 33 provided at a position on a side inward in the width direction from the throttle grip 32, a handle switch 34 provided at a position on a side inward in the width direction from the throttle housing 33, and a brake holder 35 provided at a position on a side inward in the width direction from the handle switch 34 are mounted on a right end portion of the handlebar 2. The throttle housing 33, the handle switch 34, and the brake holder 35 constitute the operation unit structure 40.

The throttle housing 33 sandwiches the handle pipe 30. The throttle housing 33 supports a throttle cable 41 extending from the throttle grip 32. The throttle cable 41 is drawn out toward an inner side in the vehicle width direction above the handlebar 2 through the throttle housing 33. Thereafter, the throttle cable 41 is routed inward in the vehicle width direction of the handle pipe 30 and is connected to a throttle valve (not illustrated).

Figure 10:
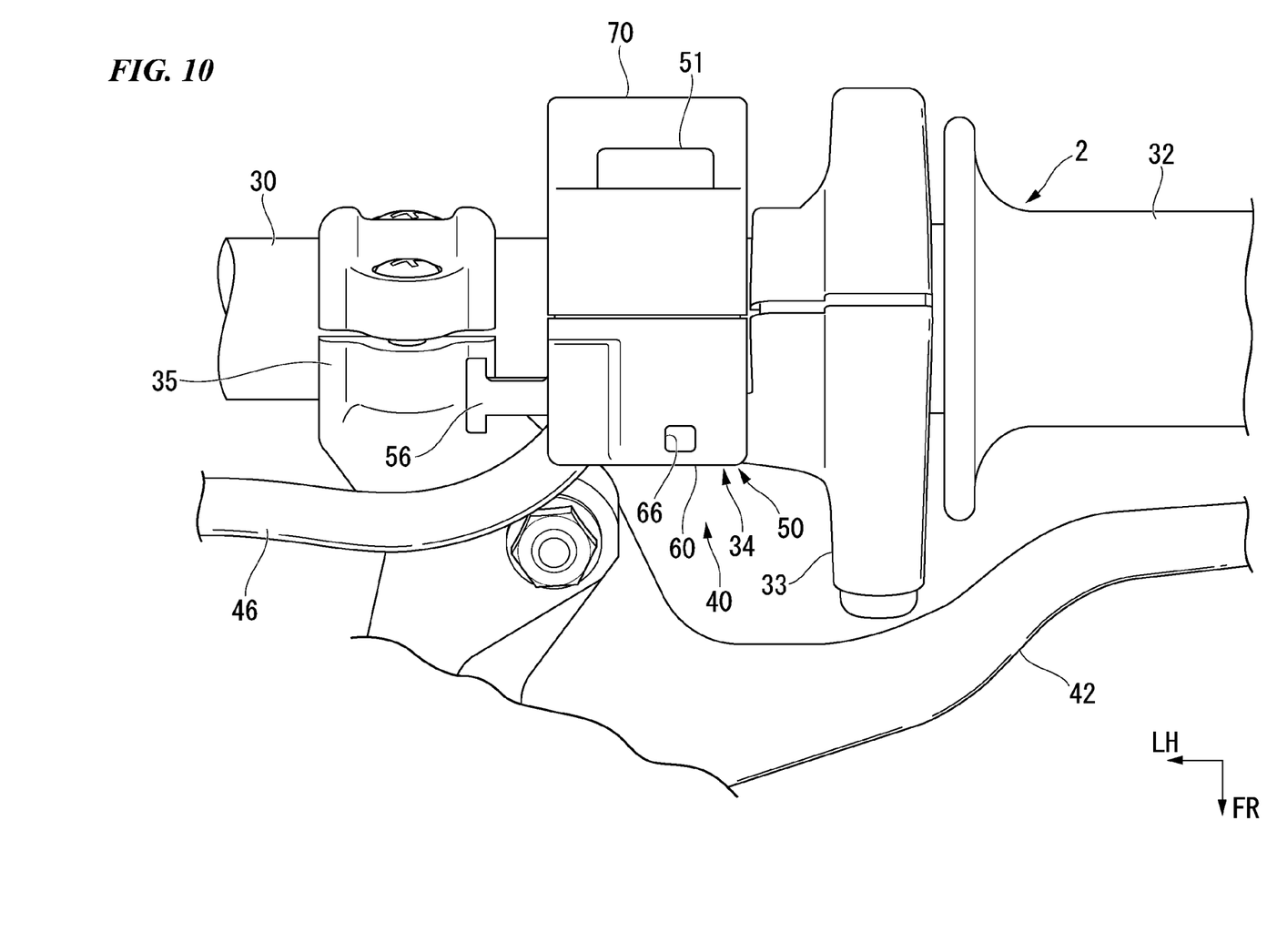
FIG. 10 is a view of the operation unit structure according to the embodiment together with a surrounding structure when viewed from below the handlebar.

The brake holder 35 supports a brake lever 42 (see FIG. 10) operated by an operator's right hand.

In FIG. 2, a reference 43 denotes a fastening member (a pair of upper and lower fastening screws in the present embodiment) for fixing the throttle housing 33 to the handle pipe 30, a reference 44 denotes a fastening member (a pair of upper and lower fastening screws in the present embodiment) for fixing the brake holder 35 to the handle pipe 30, a reference 45 denotes a brake cable, and a reference 46 denotes a harness connected to the handle switch 34.

<Handle Switch 34>

Figure 3:
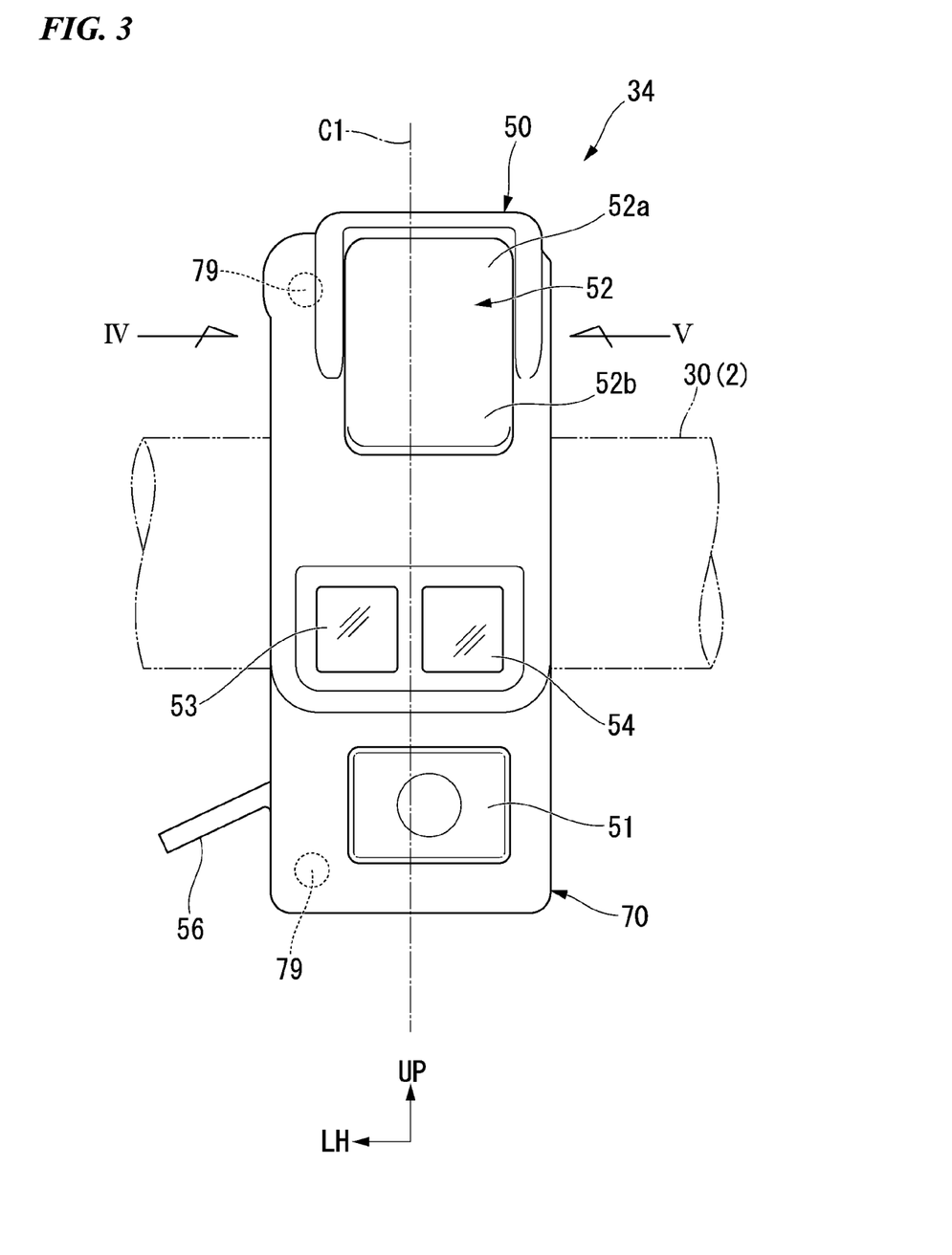
FIG. 3 is a view of a handle switch according to the embodiment from a rear side of a handlebar.

FIG. 3 is a view of the handle switch 34 from a rear side (front view) of the handlebar 2.

As illustrated in FIG. 3, the handle switch 34 includes a switch case 50 disposed close to the throttle grip 32 (see FIG. 2) which is a grip part at a portion on a right side of the handlebar 2, a start switch 51 and an engine stop switch 52 as operating elements provided in the switch case 50, and a pair of left and right indicators 53 and 54. The handle switch 34 is fixed to the handle pipe 30 so that operation surfaces of the respective operating elements (the start switch 51 and the engine stop switch 52) face the occupant. In FIG. 3, a reference C1 denotes a width direction central axis of the switch case 50 (hereinafter also referred to as a "case axis").

<Switch Case 50>

Figure 4:
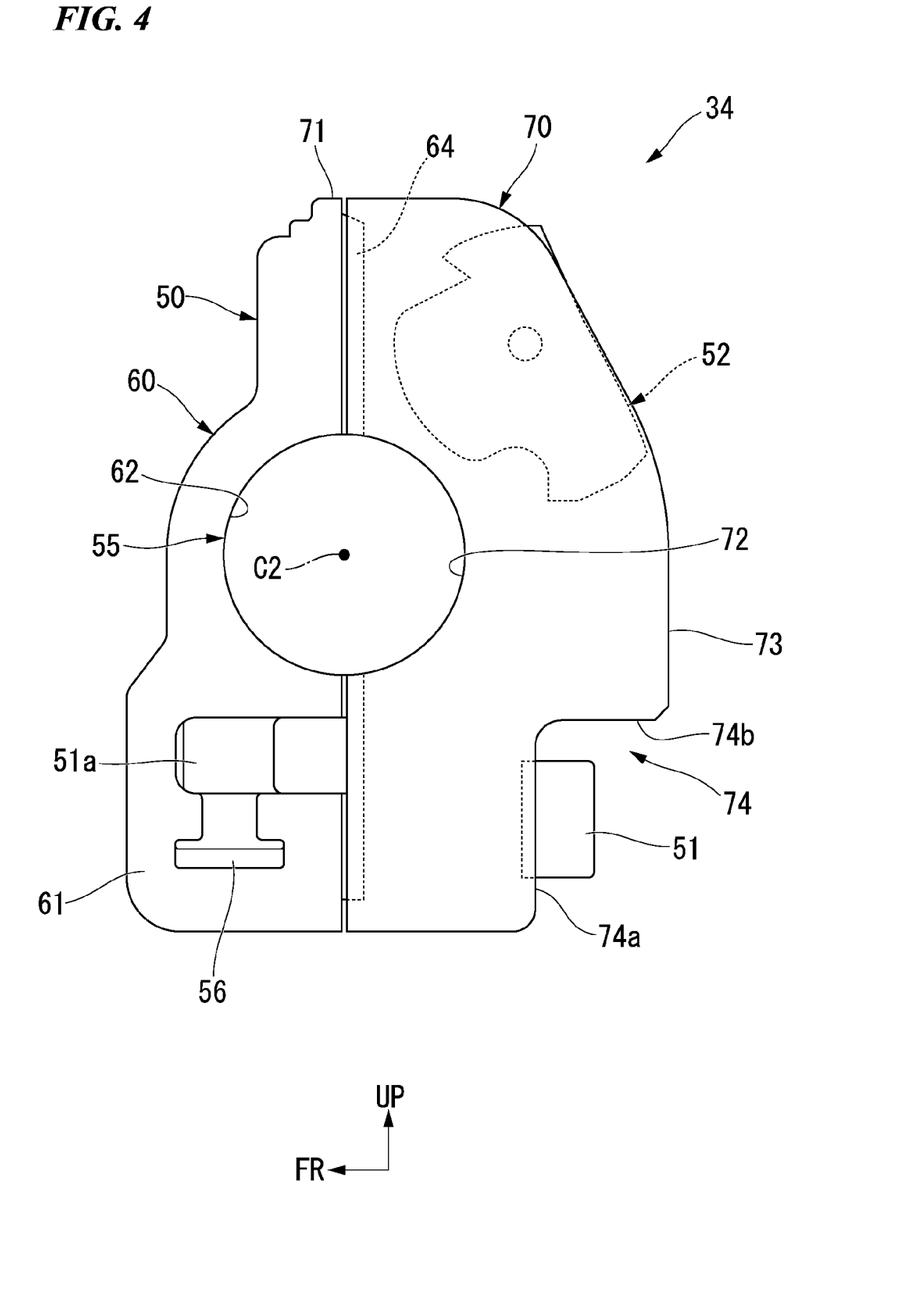
FIG. 4 is a view of the handle switch according to the embodiment from an inner side in an axial direction of the handlebar (a view taken in a direction of arrow IV in FIG. 3).

In a front view, the switch case 50 has a rectangular shape having a longitudinal dimension in the vertical direction. As illustrated in FIG. 4, the switch case 50 includes a front-side case half 60 positioned on a front side of the handlebar 2 (front side of the vehicle) and a rear-side case half 70 positioned on a rear side of the handlebar 2 (occupant side). A handlebar insertion part 55 (in the present embodiment, a fitting hole into which the handle pipe 30 is fitted) through which the handlebar 2 is inserted is provided in the switch case 50. For example, the switch case 50 can be fixed to the handle pipe 30 by fitting the handle pipe 30 into the handlebar insertion part 55 and fastening the front-side case half 60 to the rear-side case half 70 (see FIG. 3).

In a side view, the front-side case half 60 has an outer shape that bulges so that a lower accommodation part 61 accommodating a harness insertion part 51a of the start switch 51 is positioned furthest forward. In the side view, an arc-shaped recess 62 (hereinafter also referred to as a "front-side arc recess 62") following an outer shape of a front portion of the handle pipe 30 is provided in the front-side case half 60. An engaging protrusion 64 for engaging the front-side case half 60 with an opening edge part 71 of the rear-side case half 70 is provided on an outer peripheral portion of the front-side case half 60. A drain hole 66 (see FIG. 8) that opens downward is provided at a lower end portion of the front-side case half 60.

In a side view, the rear-side case half 70 has an outer shape that bulges so that an installation surface 73 of the indicators 53 and 54 is positioned furthest reward. In a side view, an arc-shaped recess 72 (hereinafter also referred to as a "rear-side arc recess 72") following an outer shape of a rear portion of the handle pipe 30 is provided in the rear-side case half 70. A recess 74 which is recessed forward from the installation surface 73 of the indicators 53 and 54 is provided in the rear-side case half 70. The recess 74 includes a first surface 74a positioned forward of the installation surface 73 of the indicators 53 and 54, and a second surface 74b straddling the installation surface 73 of the indicators 53 and 54 and the first surface 74a. In the side view, the recess 74 is formed in a stepped shape at a lower portion of the rear-side case half 70.

<Start Switch 51>

As illustrated in FIG. 4, the start switch 51 is disposed in the recess 74 of the rear-side case half 70. The start switch 51 is disposed on the first surface 74a of the recess 74. The start switch 51 is disposed below the handlebar insertion part 55. When an ignition switch is in an ON state and a transmission is in a neutral state, the start switch 51 causes the engine to start by being operated to an ON side.

As illustrated in FIG. 3, in the front view, the start switch 51 is offset toward the throttle grip 32 on a right side thereof (see FIG. 2) with respect to the case axis C1. As a result, an axis of the start switch 51 is biased to the right side, and a center of gravity of the start switch 51 is shifted to the throttle grip 32 side (the throttle housing 33 side).

Figure 6:
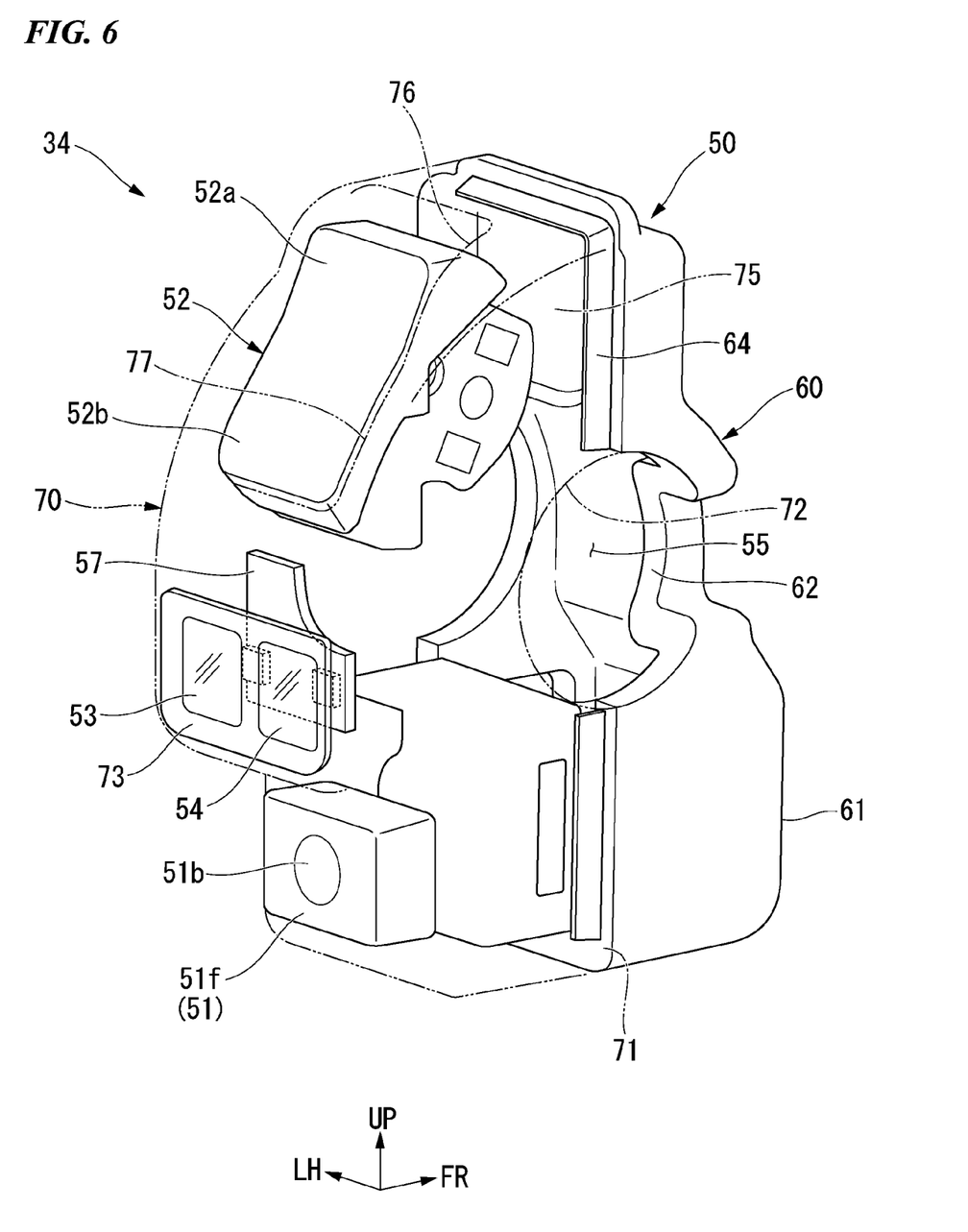
FIG. 6 is a perspective view of the handle switch according to the embodiment.

As illustrated in FIG. 6, a circular recess 51b is provided on the operation surface of the start switch 51. Thereby, operability of the start switch 51 is improved.

<Engine Stop Switch 52>

As illustrated in FIG. 3, the engine stop switch 52 is disposed on an upper portion of the switch case 50. The engine stop switch 52 is a push switch having a pair of an upper pushing operation unit 52a and a lower pushing operation unit 52b vertically adjacent to each other. The engine stop switch 52 is of a seesaw switch type in which a position on one side or the other side is held unless an operating force is applied. The engine stop switch 52 stops driving of an igniter to stop the engine in an emergency by being operated to an OFF side during operation of the engine.

In the front view, the engine stop switch 52 is offset toward the throttle grip 32 on a right side thereof (see FIG. 2) with respect to the case axis C1. As a result, an axis of the engine stop switch 52 is biased to the right side, and a center of gravity of the engine stop switch 52 is shifted to the throttle grip 32 side (the throttle housing 33 side). An amount of the offset of the engine stop switch 52 is substantially the same as an amount of the offset of the start switch 51.

Figure 5:
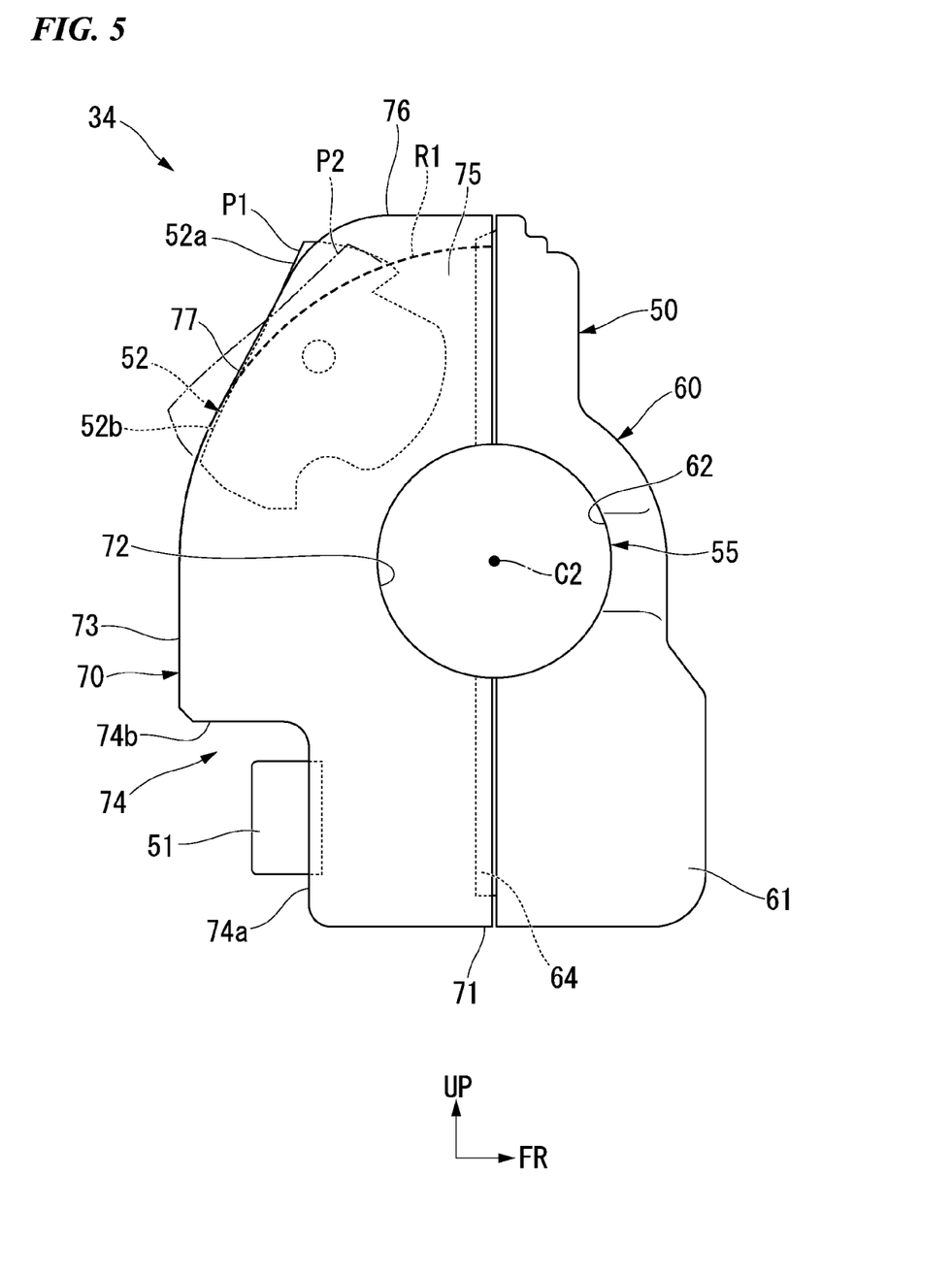
FIG. 5 is a view of the handle switch according to the embodiment from an outer side in the axial direction of the handlebar (a view taken in a direction of arrow V in FIG. 3).

As illustrated in FIG. 5, the engine stop switch 52 is able to pivot around an axis parallel to an axis of the handlebar 2 (hereinafter also referred to as a "handlebar axis C2"). In FIG. 5, a reference P1 denotes a position before the engine stop switch 52 is operated (position before pivoting), and a reference P2 denotes a position after the engine stop switch 52 is operated (position after pivoting).

In a side view, the rear-side case half 70 includes a raised part 76 that is raised upward from a reference region 75 having an arcuate outer shape centered on the handlebar axis C2 and passing through the operation surface (a surface at the position P1 before operation) of the lower pushing operation unit 52b. The raised part 76 covers the upper pushing operation unit 52a from a lateral side. In the side view, the raised part 76 has an outer shape which is continuous with the installation surface 73 of the indicators 53 and 54 via an inclined surface 77 (a tangent line of a virtual arc R1 of the reference region 75) positioned lower toward the rear side.

In the side view, the upper pushing operation unit 52a overlaps the raised part 76 in a pivot range of the engine stop switch 52. Here, the pivot range of the engine stop switch 52 means a range extending from the position P1 before pivoting of the engine stop switch 52 to the position P2 after pivoting. In the side view, a portion of the engine stop switch 52 is exposed from the raised part 76 to such an extent (within allowance of the switch) that it does not contribute to a switch stroke. That is, in the side view, a portion contributing to the switch stroke of the engine stop switch 52 overlaps the raised part 76.

<Indicators 53 and 54>

As illustrated in FIG. 3, the pair of left and right indicators 53 and 54 are disposed on a surface protruding furthest rearward of the switch case 50 (the installation surface 73 illustrated in FIG. 4). As illustrated in FIG. 2, display surfaces of the pair of left and right indicators 53 and 54 are directed inward in the vehicle width direction. The pair of left and right indicators 53 and 54 are disposed above the start switch 51. The pair of left and right indicators 53 and 54 are disposed below the engine stop switch 52.

As illustrated in FIG. 3, the pair of left and right indicators 53 and 54 are offset below a vertically central position of the switch case 50. In the front view, the pair of left and right indicators 53 and 54 overlap a lower portion of the handle pipe 30. In a front view, the pair of left and right indicators 53 and 54 are disposed at a distance on the left and right sides from the case axis C1. In a front view, each of the pair of left and right indicators 53 and 54 has a rectangular shape. For example, the indicator 53 on the left side may be a fuel injection error lamp (FI warning lamp). For example, the indicator 54 on the right side may be an ignition indicator (IGN indicator). The indicator 53 on the left side is disposed inward of the switches 51 and 52 in the vehicle width direction. The indicator 53 on the left side (a portion of the pair of left and right indicators 53 and 54) is on the occupant side relative to the switches 51 and 52, thereby improving visibility.

As illustrated in FIG. 6, a circuit board 57 connected to the pair of left and right indicators 53 and 54 is incorporated in the rear-side case half 70. A control circuit (not illustrated) for controlling lighting timings of the pair of left and right indicators 53 and 54 or the like is provided in the circuit board 57.

<Lower Housing 58>

Figure 7:
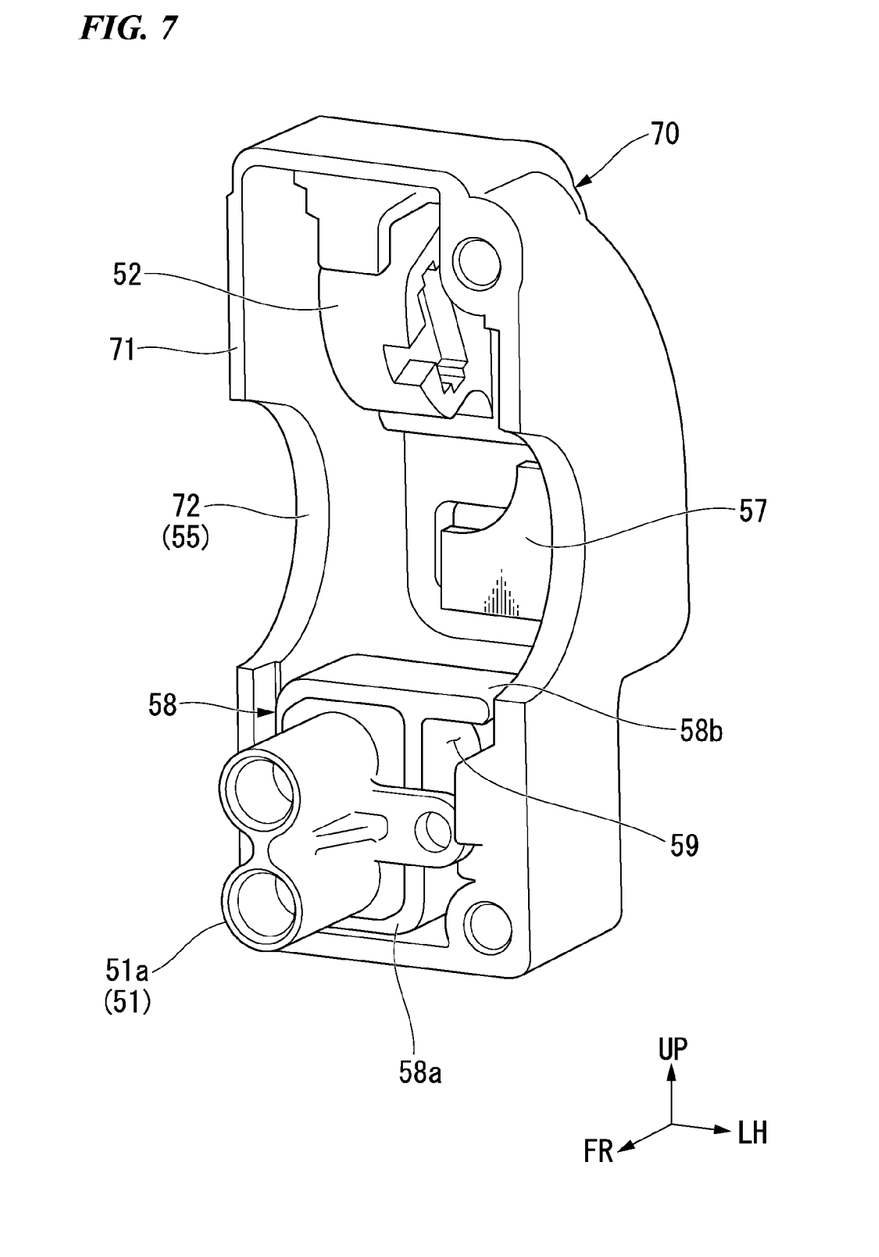
FIG. 7 is a perspective view illustrating a state in which a rear-side case half is removed from the handle switch according to the embodiment.

As illustrated in FIG. 7, a lower housing 58 accommodating a portion of the start switch 51 on a side opposite to an operation surface 51*f* (see FIG. 6) is provided below the handlebar insertion part 55. The lower housing 58 is incorporated in a lower portion of the rear-side case half 70. A protrusion 58*b* (hereinafter, also referred to as a "lateral protrusion 58*b*") which protrudes toward a side wall of the rear-side case half 70 is provided at an upper portion of the lower housing 58.

The lower housing 58 includes a frame-shaped body 58*a* in a rectangular frame shape having a longitudinal dimension in the vertical direction.

The frame-shaped body 58*a* surrounds the portion of the start switch 51 on a side opposite to the operation surface 51*f* (see FIG. 6).

The lateral protrusion 58*b* protrudes from an upper end portion of the frame-shaped body 58*a* toward an inner side wall in the width direction of the rear-side case half 70. The lateral protrusion 58*b* is formed to be capable of engaging with a harness (not illustrated) (for example, a harness of the circuit board 57 connected to the indicators 53 and 54). A space 59 through which a harness (not illustrated) can be routed is formed below the lateral protrusion 58*b*.

<Clamp Member 56>

As illustrated in FIG. 4, a clamp member 56 for engaging a harness (not shown) (for example, a harness of the start switch 51) is provided at a lower portion of an inner portion in the width direction of the front-side case half 60.

Figure 8:
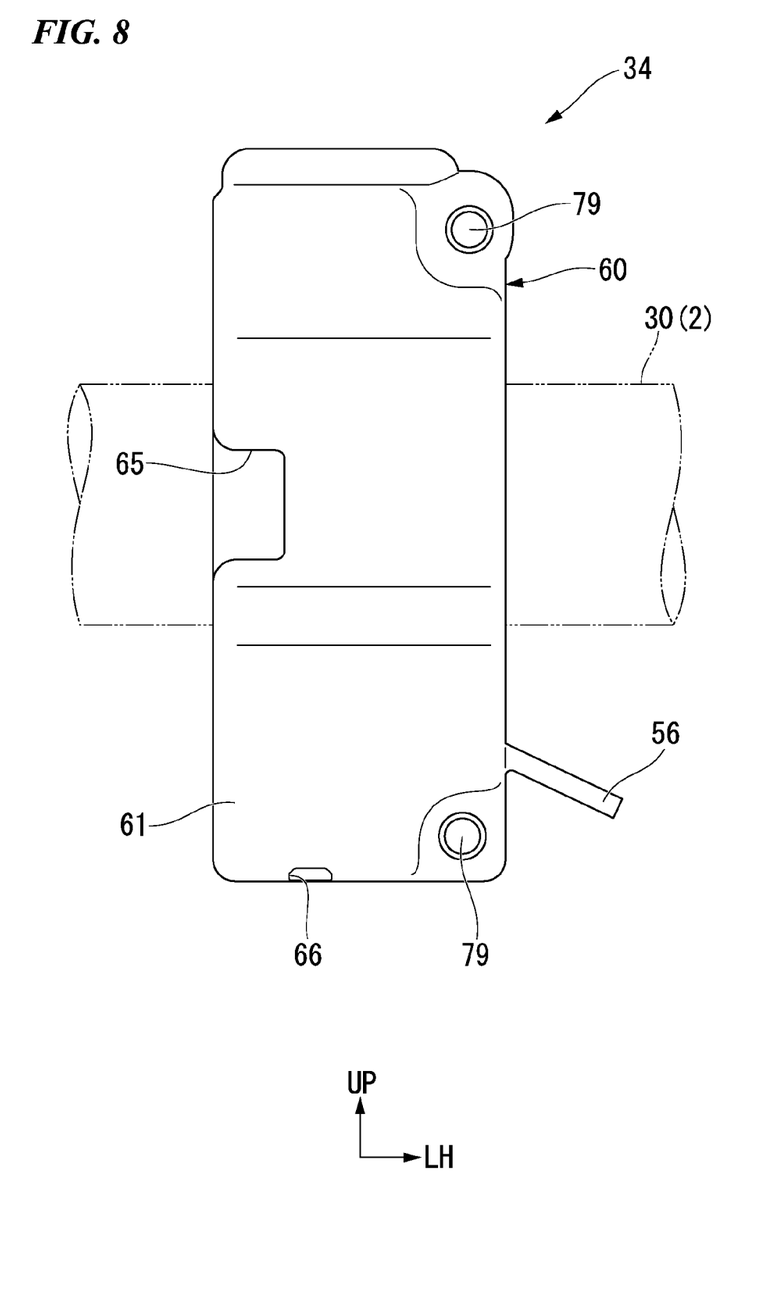
FIG. 8 is a view of the handle switch according to the embodiment from a side in front of the handlebar.

FIG. 8 is a view of the handle switch 34 from a side in front of the handlebar 2 (rear view).

As illustrated in FIG. 8, the clamp member 56 extends obliquely from the lower portion of the front-side case half 60 to be positioned lower toward the inner side in the width direction. Thus, the clamp member 56 is configured not to interfere with the brake holder 35 (see FIG. 9).

<Recess-Protrusion Structure>

As illustrated in FIG. 8, a rectangular recess 65 (hereinafter, also referred to as a "rectangular recess 65") recessed inward in the width direction is provided in an outer portion (a portion on a right side) in the width direction of the front-side case half 60. In a rear view, the rectangular recess 65 is disposed at a vertically central portion of the front-side case half 60.

Figure 9:
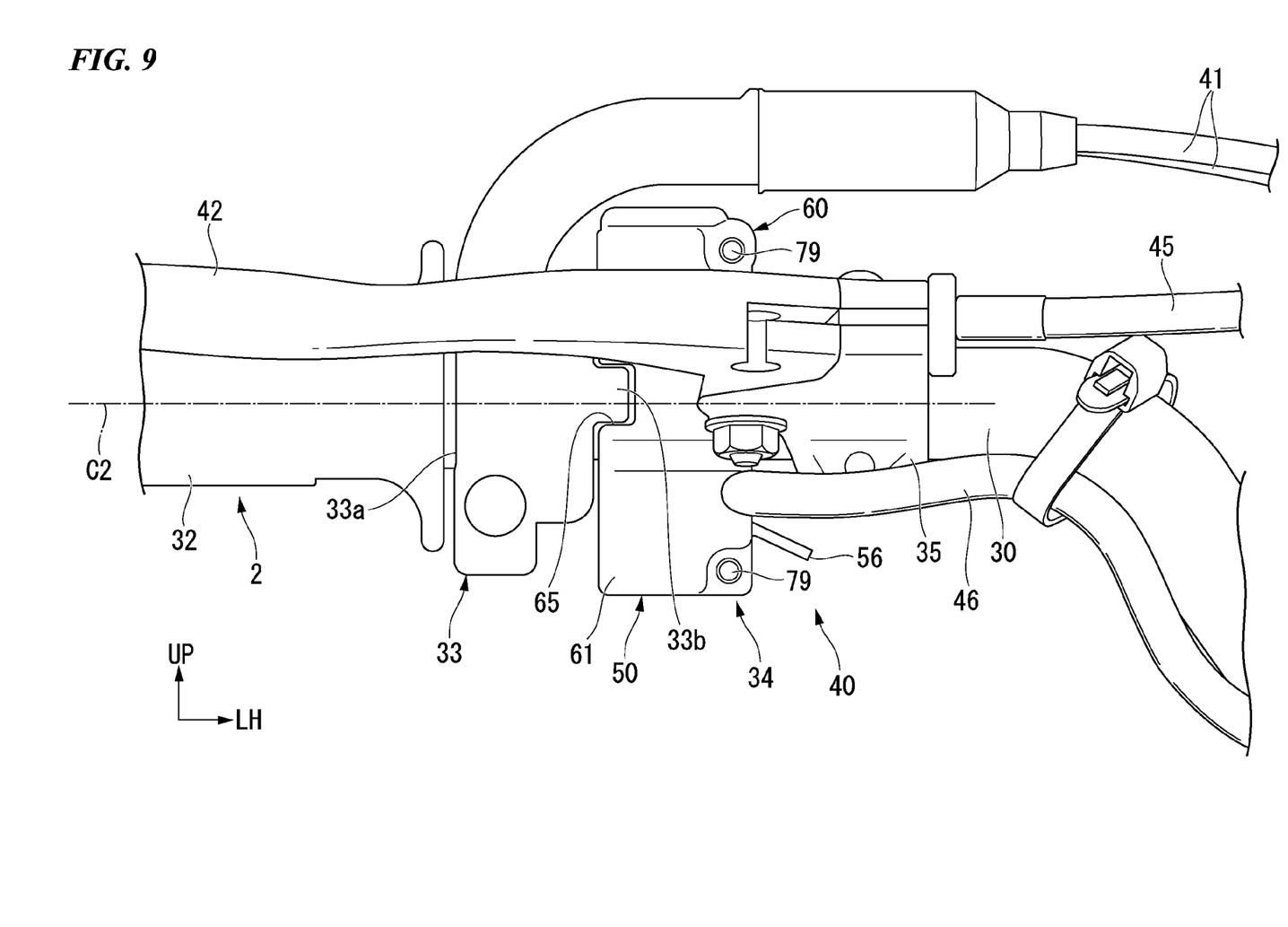
FIG. 9 is a view of the operation unit structure according to the embodiment together with a surrounding structure when viewed from the side in front of the handlebar.

As illustrated in FIG. 9, the switch case 50 is adjacent to the throttle housing 33. The switch case 50 and the throttle housing 33 are non-rotatably fitted to each other around the handlebar axis C2. In a front view, the throttle housing 33 includes a housing main body 33*a* for sandwiching the handle pipe 30 and a rectangular protrusion 33*b* (hereinafter referred to as a "rectangular protrusion 33*b*") protruding inward in the width direction from an inner portion in the width direction of the housing main body 33*a*. The rectangular protrusion 33*b* can be fitted to the rectangular recess 65 of the switch case 50.

<Attachment Method of Handle Switch 34>

For example, attachment of the handle switch 34 may be performed by the following method. First, the front-side arc recess 62 of the front-side case half 60 is fitted to surround the handle pipe 30, and the rectangular protrusion 33b of the throttle housing 33 is fitted to the rectangular recess 65 of the front-side case half 60. Next, the rear-side arc recess 72 of the rear-side case half 70 is fitted to surround the handle pipe 30, and the engaging protrusion 64 provided along an outer peripheral edge of the front-side case half 60 is engaged with the opening edge part 71 of the rear-side case half 70. Thereafter, the front-side case half 60 and the rear-side case half 70 sandwiching the handle pipe 30 are coupled by a fastening member 79 (a pair of upper and lower fastening screws in the present embodiment).

As described above, the operation unit structure 40 of the above-described embodiment includes the switch case 50 disposed close to the grip part 32 of the handlebar 2 of the motorcycle 1, the operating element 51 provided in the switch case 50, and the indicators 53 and 54 provided in the switch case 50 common to the operating element 51.

According to this configuration, it is not necessary to separately and independently provide a stay or the like for installing the indicators 53 and 54 due to the indicators 53 and 54 provided in the switch case 50 common to the operating element 51. Accordingly, the number of parts can be reduced. In addition, since the indicators 53 and 54 can be seen at the time of operating the operating element 51, visibility of the indicators 53 and 54 is improved.

In the above-described embodiment, since the indicators 53 and 54 are disposed on the surface 73 protruding furthest rearward of the switch case 50 so that the indicators 53 and 54 can be made to stand out, the visibility of the indicators 53 and 54 is further improved.

In the above-described embodiment, since the display surfaces of the indicators 53 and 54 are directed inward in the vehicle width direction so that the display surfaces of the indicators 53 and 54 face the occupant, the visibility of the indicators 53 and 54 is further improved.

In the above-described embodiment, since the indicators 53 and 54 are disposed above the start switch 51, the indicators 53 and 54 can be made more visible at the time of starting.

In the above-described embodiment, since the recess 74 which is recessed forward from the installation surface 73 of the indicators 53 and 54 is provided in the switch case 50 and the start switch 51 is disposed in the recess 74, it is possible to prevent the operator's knee from hitting the start switch 51 from below. In addition, since it is not necessary to separately and independently provide a cover for protecting the operator's knee from hitting the start switch 51, the number of parts can be reduced.

In the above-described embodiment, since the push switch 52 including the pair of the upper pushing operation unit 52a and the lower pushing operation unit 52b vertically adjacent to each other is further provided and the indicators 53 and 54 are disposed below the push switch 52, the following effects are achieved. The indicators 53 and 54 can be made more visible at the time of operating the push switch 52.

In the above-described embodiment, in a side view, since the switch case 50 includes the raised part 76 that is raised outward with respect to the upper pushing operation unit 52a, it is possible to prevent the knee from hitting the upper pushing operation unit 52a from above. In addition, since it is not necessary to separately and independently provide a cover for protecting the operator's knee from hitting the upper pushing operation unit 52a, the number of parts can be reduced.

In the above-described embodiment, in a side view, since the raised part 76 is raised upward from the reference region 75 having an arcuate outer shape centered on the Handlebar axis C2 and passing through the operation surface of the lower pushing operation unit 52b and covers the upper pushing operation unit 52a from a lateral side, it is possible to prevent the operator's knee from hitting the upper pushing operation unit 52a from the lateral side.

In the above-described embodiment, in a side view, since the upper pushing operation unit 52a overlaps the raised part 76 in a pivot range of the push switch 52, the upper pushing operation unit 52a can be protected from external factors in the pivot range of the push switch 52.

In the above-described embodiment, since the switch case 50 and the throttle housing 33 are non-rotatably fitted to each other around the handlebar axis C2, there is no need to separately and independently provide a member for positioning the switch case 50 and the throttle housing 33 around the handlebar axis C2. Accordingly, the switch case 50 and the throttle housing 33 can be positioned relative to each other while reducing the number of parts.

In the above-described embodiment, the lower housing 58 disposed below the handlebar insertion part 55 and configured to accommodate the portion of the start switch 51 on a side opposite to the operation surface 51f is further provided, the lateral protrusion 58b protruding toward a side wall of the switch case 50 is provided at an upper portion of the lower housing 58, and thereby the following effects are achieved. By locking a harness connected to the indicators 53 and 54 or the like to the lateral protrusion 58b of the lower housing 58, the protrusion of the lower housing 58 can be caused to function as a harness guide.

In the above-described embodiment, when the motorcycle 1 includes the operation unit structure 40 described above, the number of parts can be reduced.

Modified Example

In the above-described embodiment, an example in which the start switch 51 and the engine stop switch 52 are provided in the switch case 50 as operating elements has been described, but the present invention is not limited thereto. For example, other switches such as a travel mode changeover switch or a neutral drive changeover switch may be provided in the switch case 50 as operating elements.

In the above-described embodiment, although an example in which the switch case 50 disposed close to the grip part at a portion on a right side of the handlebar 2 is provided has been described, the present invention is not limited thereto. For example, a switch case (hereinafter, referred to as a "left switch case") disposed close to a grip part at a portion on a left side of the handlebar 2 may be provided. For example, a shift-up switch, a shift-down switch, a horn switch, an optical axis changeover switch, a hazard lamp switch, a blinker switch, or the like may be provided in the left switch case as operating elements.

In the above-described embodiment, an example in which the FI warning lamp 53 and the IGN indicator 54 are respectively provided to the switch case 50 as the indicators 53 and 54 has been described, but the present invention is not limited thereto. For example, other indicators such as a display unit for displaying a setting state of the hardness of the suspension, a display unit for displaying information on output characteristics of the engine, or a display unit for displaying a setting state of devices of various types may be provided in the switch case 50 as the indicator.

In the above-described embodiment, an example in which two operating elements (the start switch and the engine stop switch) and two indicators (the FI warning lamp and the IGN indicator) are provided in the switch case 50 has been described, but the present invention is not limited thereto. For example, only one operating element and one indicator or three or more of each of them may be provided in the switch case 50. The disposition number of operating elements and indicators provided in the switch case 50 can be changed according to the required specifications.

In the above-described embodiment, an example in which the switch case 50 and the throttle housing 33 are non-rotatably fitted to each other around the handlebar axis C2 by fitting the rectangular protrusion 33b of the throttle housing 33 to the rectangular recess 65 of the switch case 50 has been described, but the present invention is not limited thereto. For example, a rectangular recess may be provided in the throttle housing 33, and a rectangular protrusion may be provided in the switch case 50. The switch case 50 and the throttle housing 33 may be non-rotatably fitted to each other around the handlebar axis C2, by providing a recess-protrusion structure between the switch case 50 and the throttle housing 33.

Further, the present invention is not limited to the above-described embodiments, and, for example, the straddle-type vehicles described above may include general vehicles on which a driver straddles the vehicle body to ride, including not only motorcycles (such as motorized bicycle and scooter type vehicle) but also three-wheeled vehicles (such as vehicles with two front wheels and one rear wheel as well as vehicles with one front wheel and two rear wheels). Also, the present invention is applicable not only to motorcycles but also to four-wheeled vehicles such as automobiles.

The configuration in the above-described embodiment is an example of the present invention, and various changes can be made without departing from the scope of the present invention such as replacing the components of the embodiment with well-known components.

What is claimed is:

1. An operation unit structure of a straddle-type vehicle comprising:
   a switch case disposed at a position on a side inward in a vehicle width direction from a grip part of a handlebar of a straddle-type vehicle;
   an operating element provided in the switch case;
   indicators provided in the switch case common to the operating element; and
   a push switch including a pair of an upper pushing operation unit and a lower pushing operation unit vertically adjacent to each other, wherein,
   in a side view, the switch case includes a raised part that is raised outward with respect to the upper pushing operation unit and covers the upper pushing operation unit from a lateral side.

2. The operation unit structure of a straddle-type vehicle according to claim 1,
   wherein the indicators are disposed on a surface protruding furthest rearward of the switch case.

3. The operation unit structure of a straddle-type vehicle according to claim 1,
   wherein display surfaces of the indicators are directed inward in a vehicle width direction.

4. The operation unit structure of a straddle-type vehicle according to claim 1,
   wherein the operating element is a start switch, and
   the indicators are disposed above the start switch.

5. The operation unit structure of a straddle-type vehicle according to claim 4,
   wherein a recess which is recessed forward from a installation surface of the indicators is provided in the switch case, and
   the start switch is disposed in the recess.

6. The operation unit structure of a straddle-type vehicle according to claim 1,
   wherein
   the indicators are disposed below the push switch.

7. The operation unit structure of a straddle-type vehicle according to claim 1,
   wherein, in a side view, the raised part is raised upward from a reference region having an arcuate outer shape centered on an axis of the handlebar and passing through an operation surface of the lower pushing operation unit and covers the upper pushing operation unit from the lateral side.

8. The operation unit structure of a straddle-type vehicle according to claim 7,
   wherein the push switch is capable of pivoting, and
   the upper pushing operation unit overlaps the raised part in a pivot range of the push switch in a side view.

9. The operation unit structure of a straddle-type vehicle according to claim 1,
   wherein the grip part is provided at a portion on a right side of the handlebar,
   a throttle housing disposed at the position on the side inward in the vehicle width direction from the grip part is further provided,
   the switch case is adjacent to the throttle housing, and
   the switch case and the throttle housing are non-rotatably fitted to each other around an axis of the handlebar.

10. The operation unit structure of a straddle-type vehicle according to claim 1,
    wherein a handlebar insertion part through which the handlebar is inserted is provided in the switch case,
    the operating element is a start switch disposed below the handlebar insertion part,
    a lower housing disposed below the handlebar insertion part and configured to accommodate a portion of the start switch on a side opposite to an operation surface is further provided, and
    a protrusion protruding toward a side wall of the switch case is provided at an upper portion of the lower housing.

11. A straddle-type vehicle comprising the operation unit structure of a straddle-type vehicle according to claim 1.

* * * * *